United States Patent [19]
Tyutinman

[11] Patent Number: 5,338,086
[45] Date of Patent: Aug. 16, 1994

[54] AUTOMOBILE WINDOW SHADE SYSTEM

[76] Inventor: Adolf Tyutinman, 2983 Cambridge Dr., San Jose, Calif. 95125

[21] Appl. No.: 151,152

[22] Filed: Nov. 12, 1993

Related U.S. Application Data

[62] Division of Ser. No. 933,392, Aug. 21, 1992, Pat. No. 5,316,363.

[51] Int. Cl.$^5$ .................................................. B60J 1/20
[52] U.S. Cl. ...................................... 296/138; 296/141; 296/143; 74/502.3; 74/502.6; 474/154; 160/319; 160/321
[58] Field of Search ............... 296/138, 140, 141, 143, 296/97.4, 97.8; 160/120, 126, 239–241, 321, 123, 319, 370.2 A; 74/502.3, 502.6, 89.22; 474/154

[56] References Cited

U.S. PATENT DOCUMENTS

| | | | |
|---|---|---|---|
| 1,530,068 | 3/1925 | Abbott | 160/126 |
| 2,302,296 | 11/1942 | Cluett | 74/502.6 X |
| 3,861,738 | 1/1975 | Whitney | 296/138 |
| 4,865,109 | 9/1989 | Sherman | 160/321 |

Primary Examiner—Dennis H. Pedder
Attorney, Agent, or Firm—David Pressman

[57] ABSTRACT

An automobile window shade system comprises a frame (20) formed of hollow horizontal elements (20a through 20d) and hollow vertical elements (22a through 22f) interconnected by T-shaped connectors (24a through 24f). The frame is installed inside the automobile and contains a beaded cord (128) with beads or expansions (130) rigidly attached to the cord. Two adjacent shades (142 and 144) are made of a light-impermeable flexible material and are attached to a yoke. An embodiment with a beaded thread (128) and an expandable spring-loaded C-shaped portion of the yoke makes it possible to shield and unshield windows selectively by fixing the yoke and pulling the beaded cord through the spring-loaded C-shaped hole of the yoke. As a result, the shades are shifted to a new initial position and then moved from this new position.

14 Claims, 9 Drawing Sheets

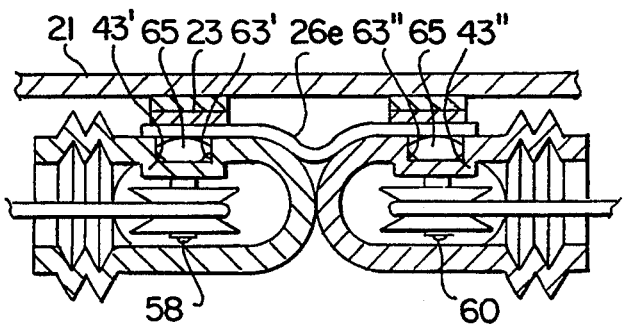
FIG.3
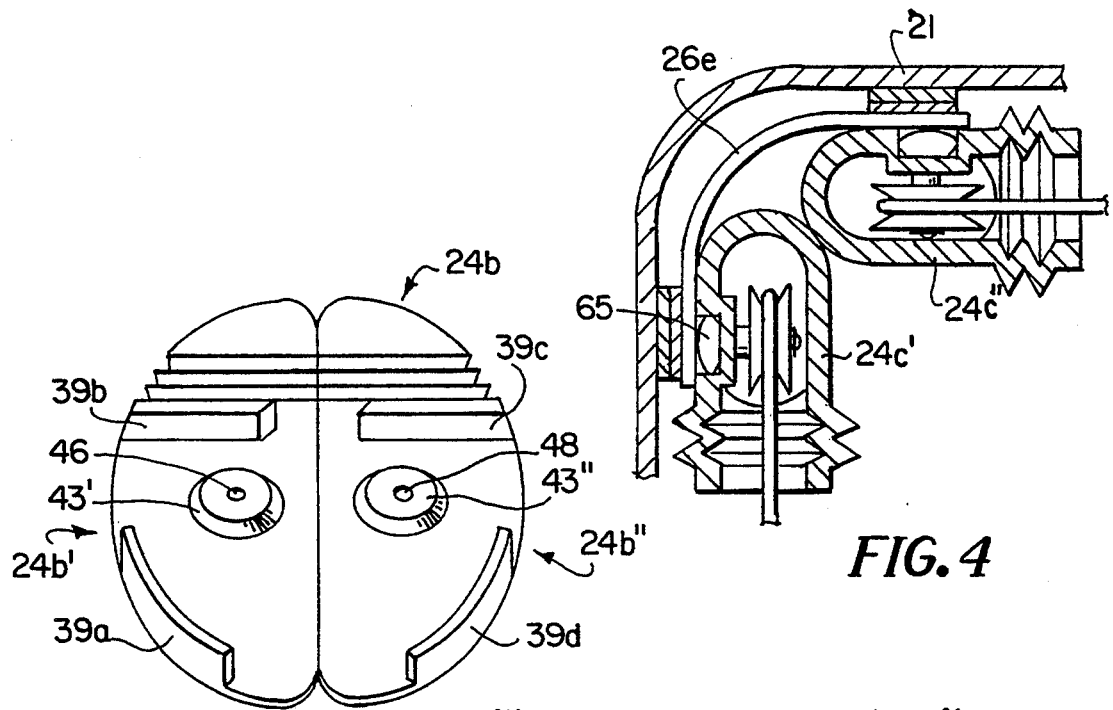
FIG.5
FIG.4
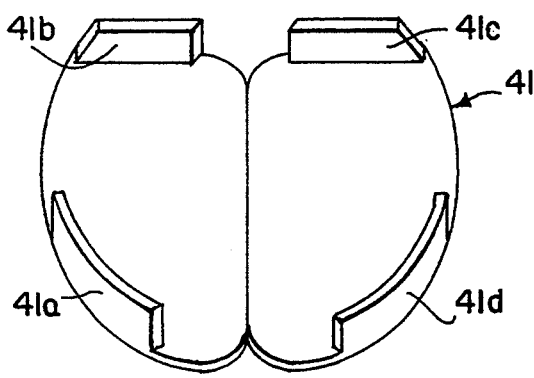
FIG.6

AUTOMOBILE WINDOW SHADE SYSTEM

CROSS REFERENCE TO RELATED APPLICATION

This application is a division of Ser. No. 07/933,392, filed 1992 Aug. 21, now U.S. Pat. No. 5,316,363 granted May 31, 1994.

FIELD OF THE INVENTION

The present invention relates to automobile window shades, particularly to an automobile window shade system capable of shading all windows of an automobile simultaneously.

DESCRIPTION OF PRIOR ART

The interior of a vehicle parked outdoors in the summer sun can become extremely warm and uncomfortable for its occupants. Moreover, direct sunlight damages the upholstery, dashboards, steering wheels, seats, and other parts of the automobile's interior, causing them to fade, dry out, or crack. Therefore various window shading devices are used to protect automobile interiors from the damaging action of direct sunlight.

One of the most popular and simple types of window shading devices is an accordion-folded window blind. Such blinds, which are produced, e.g., by Auto-Shade Inc., North Hollywood, Calif., are made of cardboard, can be folded and unfolded, and can be stored in the trunk of an automobile. However, these blinds are designed specifically for shading only the portion of the automobile under the windshield; they have a special cutout for rearview mirrors. Furthermore, folding and unfolding the blends takes time. Besides, the cardboard can be quickly damaged and must be often replaced. During the day, the sun changes position with respect to the automobile, so that its rays penetrate the automobile through unprotected side windows. Window blinds have been used, and although they are adjustable in the horizontal direction, they have a fixed vertical dimension, which makes them inconvenient for use in automobiles of some models.

U.S. Pat. No. 4,944,548 to G. Payne et al. (1990) discloses a side window shade for automobiles. The shade is formed of a plurality of pivotally connected sections which form a panel. An upper edge of the panel is configured with a curvature corresponding to an automobile side window frame and includes a plurality of spaced notches which receive suction cup retainers for insertion of suction cups attachable to an automobile side window. This device also protects only side-window portions of the automobile's interior. It must be removed for driving and reinstailed for parking in a sunny place every time. Therefore it is inconvenient in use. Moreover, suction cups can be easily damaged because of frequent connection and disconnection. Since the suction cups are subject to direct sunlight, their material quickly looses elasticity, making them unsuitable for further use.

U.S. Pat. No. 5,0642,38 to M. Mohtasham (1991) describes a windshield sunshade assembly which can be mounted on the pivoted connector portion of the sun visor attachment of a automobile. Thus a shade member, which is wound into a roll, can be unwound and retracted or extended in order to cover the windshield from inside the automobile. This device has the same disadvantages as other conventional automobile-interior shading means, i.e., it shields only the automobile's interior under the windshield.

Even if all of an automobile's windows are shaded separately by the above conventional devices, it would be necessary to close and open each window shade separately, an inconvenient and time-consuming operation.

Objects and Advantages

It is therefore an object of the invention to eliminate the above disadvantages and to provide an automobile window shade system which protects the entire automobile's interior from direct sunlight, which makes it possible to shield and unshield all automobile windows simultaneously with a single operation, which is adjustable in a vertical direction, and which is durable and has a long service life. Another object is to provide a shading system capable of selectively shading or unshading separate automobile windows. Other advantages and features will become apparent from a consideration of the ensuing description and drawings.

DRAWING FIGURES

FIG. 3 is a top view of a connector for an intermediate column used in such system.

FIG. 4 is a top view of a corner connector for a corner column of the frame.

FIG. 5 is a front view of a T-shaped connector used in the frame and shown in an open state and prior to assembling.

FIG. 6 is a view of a cover for a T-shaped connector of FIG. 5.

FIGS. 1–4-Description of Frame

Figure 1:
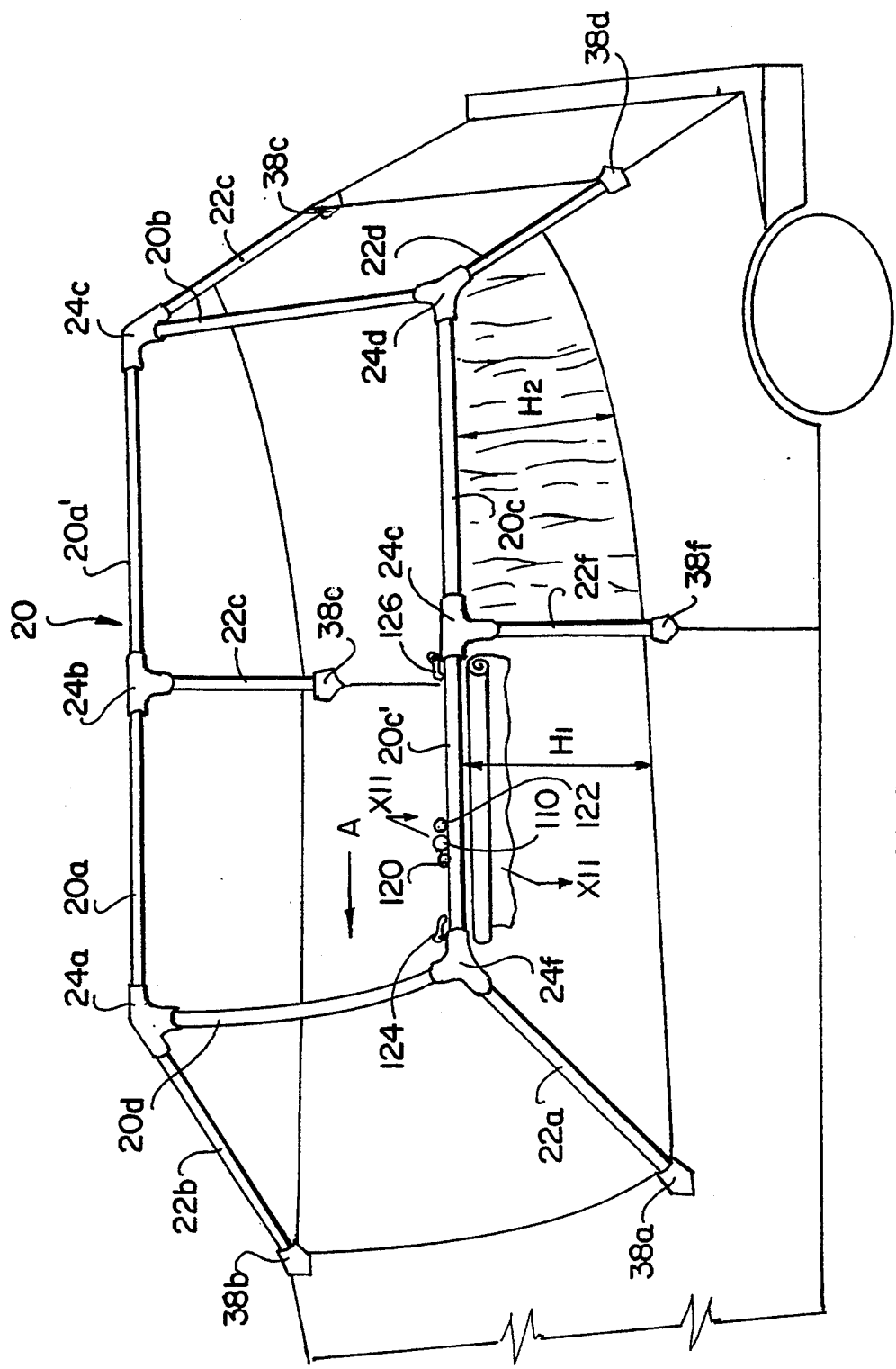
FIG. 1 is a top three-dimensional view of a window shade system of the invention within the outlines of an automobile shown in phantom lines.

A general view of a system of the invention is shown in FIG. 1, a top three-dimensional view illustrating positions of the elements of the system inside an automobile whose outlines are shown by phantom lines.

The system consists of a rectangular frame 20 composed of horizontal tubular elements 20a, 20a', 20b, 20c, 20c', and 20d and a number of vertical struts or columns 22a through 22f connected to frame 20. The term "vertical" covers substantially vertical or slightly inclined columns of the automobile's body. Six vertical columns are shown, although their number may be different.

Frame 20 is installed inside an automobile's body having windows (not shown) of different heights, including a window of a smallest height and a window of a greatest height. Each window has an upper side and a lower side. Horizontal tubular elements of frame 20 are aligned with or located above the above-mentioned upper sides of the windows.

Figure 2:
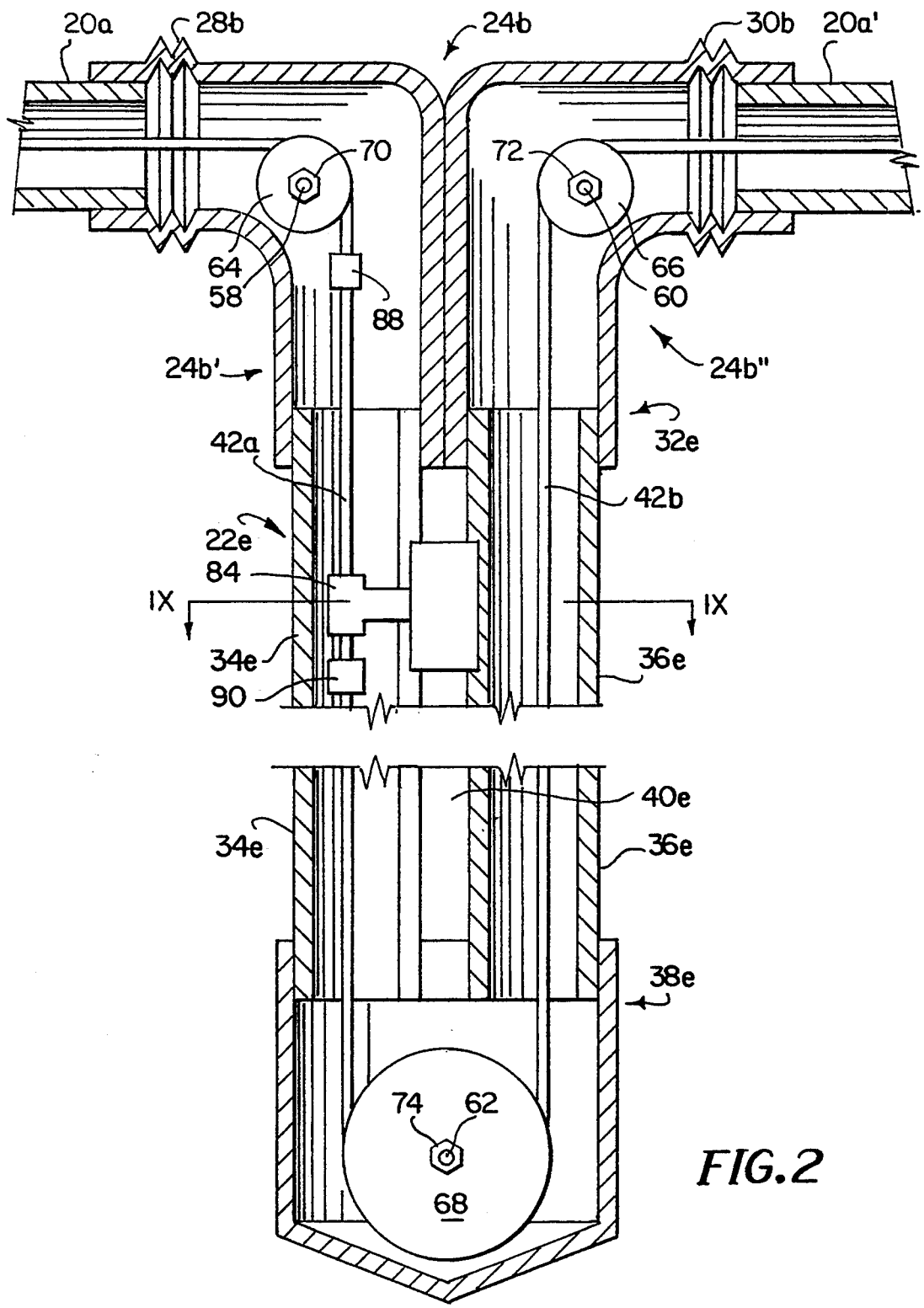
FIG. 2 is a side view of an intermediate vertical column in the system of FIG. 1 with details of a cord guiding mechanism and its attachment to horizontal tubular elements of the frame of such system.

The tubular frame elements are interconnected through T-shaped connection elements 24a through 24f. The number of T-shaped connectors will depend upon the number of vertical columns 22a to 22f. FIGS. 2 and 3A show a more detailed structure of a typical T-shaped connector of the type located in frame 20, i.e., of one of connectors 24b and 24e. FIG. 2 is a side view of a column 22e which is connected to horizontal elements 20a and 20a'. All six connectors are identical. Therefore only one of them, i.e., 24b, will be described in detail below. FIGS. 2 and 3 show a top view of connector 24b. This connector consists of two parts 24b' and 24b". Both parts 24b' and 24b" have rounded facing ends which are in contact with each other so that parts 24b' and 24b" can be turned with respect to each other while remaining in contact. Both parts are kept together by means of a flexible strap 26e and are attached to an interior 21 of an automobile's body, e.g., by adhesive 23 (FIG. 3).

Each connector part 24b' and 24b" has a flexible coupling end 28b or 30b, respectively. Flexible coupling ends 28b and 30b are designed for flexibly interconnecting two adjacent horizontal tubular elements 20a and 20a'. Flexible coupling ends 28b and 30b may be made, e.g., in the form of bellows, as shown in the attached drawings. This means that horizontal tubular elements 20a and 20a', interconnected through T-shaped connector 24b, may be slightly tilted with respect to each other and deviated from a straight-line extension of one another. In other words, the horizontal elements of the frame may conform to an actual curvilinear configuration of the base of the automobile's roof (not shown).

Column 22e is inserted into the lower end 32e of coupling 24b. Since column 22e is always arranged vertically, lower coupling end 32e does not need flexibility.

As all vertical columns are identical, only one of them, i.e., 22e, will be described in detail. Column 22e consists of two parallel tubes 34e and 36e. The upper ends of tubes 34e and 36e are inserted into lower coupling end 32e of T-shaped connector 24b, more specifically, into lower ends of respective parts 24b' and 24b".

The lower ends of tubes 34e and 36e are inserted into a foot 38e which keeps the lower ends of tubes 34e and 36e together and also serves for attaching the lower ends of vertical column 22e to an element of an automobile's body (not shown). It can be attached by means of an adhesive, or hook-and-loop fasteners. Tubes 34e and 36e have a space 40e between each other for the purpose explained later.

Intermediate vertical column 22e and intermediate T-shaped connector 24b, which connects two horizontal tubular elements 20a and 20a', are arranged almost on the same straight line. T-shaped connectors 24a, 24c, 24d, and 24f and their respective vertical columns 22b, 22c, 22d, and 22a are identical to those described above. An exception is that connector parts, e.g., 24c' and 24c", which are shown in FIG. 4, can pivot up to 90° with respect to each other to conform to the shape of the corner of the body.

FIG. 4 is a top view of a T-shaped connector 24c located in the corner of the body. As has been mentioned, due to a provision of flexible strap 26e, connector parts 24b' and 24b", described with reference to FIGS. 2 and 3, can be turned with respect to each other by about 90° to the position of FIG. 4 without disengagement from each other.

FIG. 5 is a front view of the T-shaped connector in an open state and prior to assembly with frame 20. The connector, which may be, e.g., connector 24b, has projections 39a, 39b, 39c, and 39d which are formed on the connector's edge.

For protective and decorative purposes, each T-shaped connector is closed with a respective cover 41 which is shown in FIG. 6. Cover 41 has the same configuration as the T-shaped connector itself and has edges 41a, 41b, 41c, and 41d which snap in respective projections 39a through 39d of the connector. Each connector part 24b' and 24b" has on its rear side projections 43' and 43" (FIG. 5) which form on the opposite side recesses 63' and 63" (FIG. 3) with respective holes 46 and 48 through the wall of the connector. As will be explained further, projections 43' and 43" and holes 46 and 48 serve for attachment of a pulley.

Figure 7:
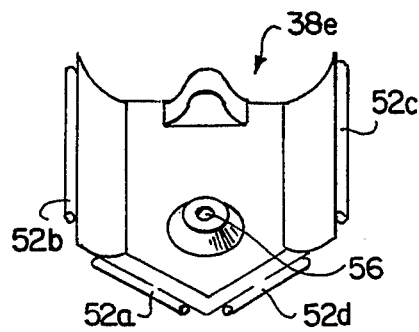
FIG. 7 is a perspective view of a foot for the vertical column.
Figure 8:
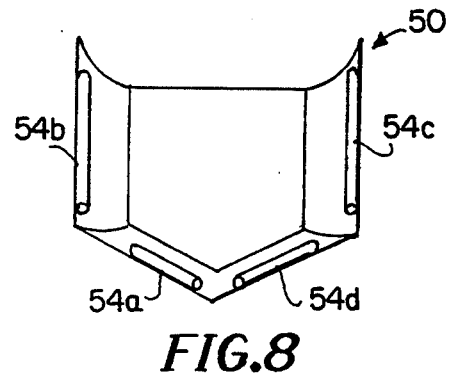
FIG. 8 is a perspective view of a cover for the foot.

FIG. 7 is a perspective view of a foot, e.g., foot 38e, and FIG. 8 is a perspective view of a foot cover 50. Foot 38e has on its sides inner projections 52a through 52d which are designed for engagement with snap-on edges 54a through 54d of cover 50.

Recesses (not shown) and holes 56, similar to those described with reference to the connector, are formed also in each foot 38a through 38f for attachment of pulleys located in the foot portion of the frame, as will be described later.

FIGS. 2–8-Cord-Guiding and Window-Shade Attachment Mechanisms

As has been described above, frame 20 and all vertical columns 22a through 22f are made of hollow tubular elements, the interior of which houses an endless cord 42a–42b (FIG. 2) which is guided over a plurality of pulleys. A portion of the cord-guiding mechanism located in each T-shaped connector and its respective vertical column and foot is identical and consists of three pulleys. Thus only one portion of the cord-guiding mechanism, located in connector 24b, column 22e, and foot 38e, will be described with reference to FIG. 2.

Inserted into holes 46, 48, and 56 are threaded studs 58, 60, and 62. Studs 58 and 60 are fixed in connector parts 24b' and 24b" by means of nuts 65 which are placed into recesses 63' and 63" (FIG. 3). Stud 62 is fixed in foot 38e (FIG. 2) also by means of a nut (not shown) located in the same recess. Smooth portions of studs 58, 60, and 62 support pulleys 64, 66, and 68, respectively. Pulleys 64, 66, and 68 can freely pivot on their studs and are fixed against displacement in the axial direction of the studs, e.g., by means of lock rings 70, 72, and 74.

Guided over pulleys 64, 66, and 68 is endless cord 42a–42b which, as has been mentioned, passes through the entire system formed by the hollow tubular frame 20. In other words, only a portion of the cord is shown in FIG. 2.

A first pulley 64 and a second pulley 66 are rotatably installed inside each of the T-shaped connectors and a third pulley 68 is rotatably installed inside a respective vertical element which is inserted into each T-shaped connector. Third pulley 68 is located below the lower side of the window (not shown). Cord 42 is guided over pulleys 64, 66, and 68 so that it forms two vertical runs 42a and 42b inside the vertical element (22e in FIG. 2).

Figure 9:
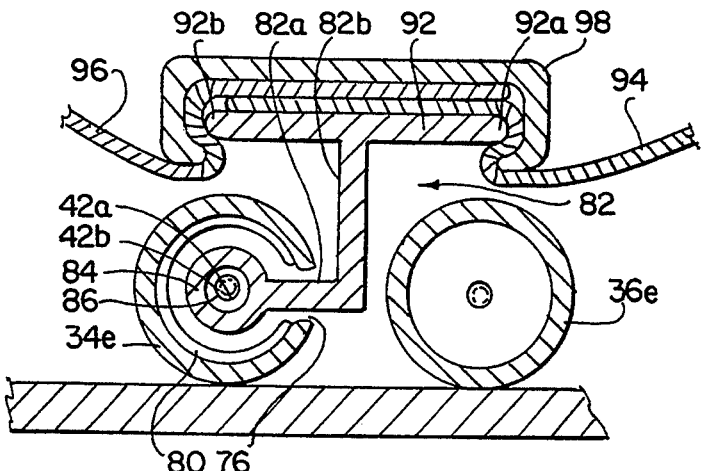
FIG. 9 is a transverse sectional view taken line IX—IX of FIG. 2.

One tube of each column has a longitudinal slot which passes through the entire length of the column. Since all such slots and mechanisms associated therewith are identical, only one of them will be described and shown with reference to FIG. 9, which relates to column 22e. As shown in FIG. 9, tube 34e has a longitudinal slot 76 which is formed on the side of tube 34e facing tube 36e. A vertical slot 76 is formed between tubes 34e and 36e. Inserted into tube 34e is a C-shaped spring 80 which tends to expand radially outwardly so that it radially expands tube 34e and thus increases longitudinal slot 76.

FIG. 9 is a sectional view taken in the direction indicated by line IX—IX of FIG. 2. As shown, inserted into tube 34e is an L-shaped element 82 which has an inner leg 82a inside tube 34e and an outer leg 82b outside tube 34e. Outer leg 82b projects outwardly from slot 76 toward the interior of the automobile. Inner leg 82a terminates in a cylindrical yoke 84 with a hole 86. Cord 42 freely passes through hole 86.

FIG. 2 shows cord 42a–42b with stop elements 88 and 90. Each stop element is rigidly attached to cord 42a–42b, e.g., by crimping so that paths of movement of the stop elements during shading and unshading of the windows intersect the yoke.

Stop element 88 is located above yoke 84 and stop element 90 is located below yoke 84. The length of the cord between the stop elements corresponds to the height of a window (not shown) along which vertical column 22e extends.

As shown in FIG. 9, outer leg 82b terminates in a flat pad 92 with rounded edges 92a and 92b. The sides of window shades 94 and 96, which are intended for shading adjacent windows (not shown), are laid one onto another in an overlapping manner as shown. Shades 94 and 96 are fixed in the overlapped position by a snap-on cover 98 which has a U-shaped cross-sectional configuration and snaps on rounded edges 92a and 92b of pad 92 when cover 98 is pressed down.

Thus, each yoke, e.g., yoke 84, interacts with a pair of stops, e.g., stops 88 and 90, which are attached to one run of the cord, e.g., run 42a.

The structure of L-shaped elements and mechanisms of attachment and fixation of shades are identical between each pair of adjacent windows.

Figure 10:
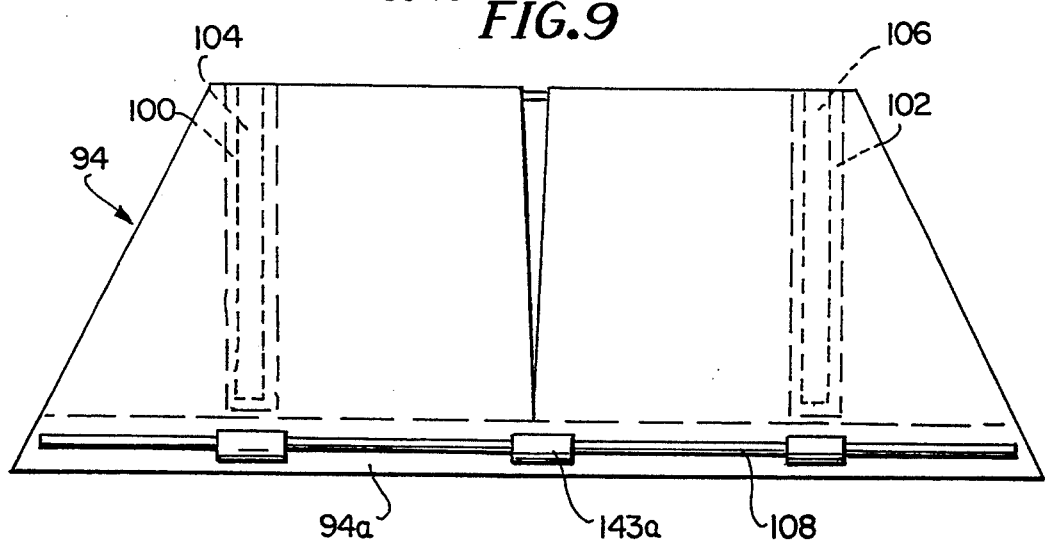
FIG. 10 is a view of a shade of the system in a window-closing position.

FIG. 10 is a view of one of the shades, e.g., shade 94, in an unfolded position. Shade 94 is shown with a trapezoidal shape, thereby assuming that a respective window has the same shape. In any case, the shape of the shade should correspond to the shape of the respective window to be shielded.

Shade 94 has vertical pockets 100 and 102 which are located symmetrically and closer to respective sides of the shade. Inserted into pockets 100 and 102 are flat spiral compression springs 104 and 106, respectively. Each spring, which has the shape of a clock spring, tends to compress to a smaller diameter and to assume its initial compressed position.

A lower edge 94a of shade 94 has a rubber cord 108 which tends to compress the shade in the horizontal direction.

Figure 11:
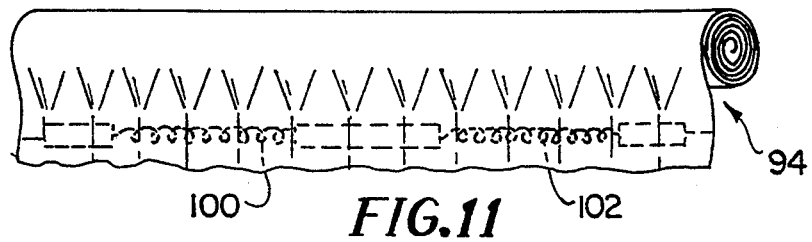
FIG. 11 is a view of the shade of FIG. 10 when the window is unshaded.

When shade 94 is pulled down to the window shading position, it has a configuration of the type shown in FIG. 10, and when it is lifted for unshading the window, springs 104 and 106 wind the shade into a roll, as shown in FIG. 11.

The system has a handle 110 in a position convenient for a driver to shade or unshield the windows. In FIG. 1 handle 110 is shown on the left side of the driver's seat, although the handle can be located in any place along the path of the cord.

Handle 110 is rigidly attached to the cord, e.g., by clamping or crimping. An example of a handle and its attachment to the cord are shown in FIG. 12, which is a sectional view in the direction of lines XII—XII of FIG. 1.

Figure 12:
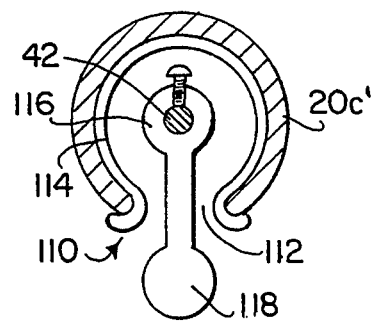
FIG. 12 is a sectional view taken in the direction indicated by line XII—XII of FIG. 1.

As shown in FIG. 12, horizontal tubular element 20c' has a longitudinal slot 112 located on the lower side of the tube. Similar to vertical tubular element 34e, horizontal tubular element 20c' is constantly expanded radially outwardly by a C-shaped spring 114. A yoke part 116 of handle 110 is crimped on cord 42, while a grip portion 118 projects through slot 112 inward and faces downward.

Handle 110 may have at its both sides spherical projections 120 and 122, while two respective snap-in locks 124 and 126 (FIG. 1) are provided in the positions corresponding to the ends of the stroke of handle 110. Thus handle 110 can be fixed in the leftward position (shades closed) or in the rightward position (shades open).

For complete shading of all windows, the length of the stroke of handle 110 between locks 124 and 126 must be equal to or greater than the height of the largest window. First stop 88 (FIG. 2) is located at some distance above yoke 84, while second stop 90 is located at some distance under yoke 84. Thus for any of the windows, except for the largest one, the distance between first stop 88 and second stop 90 is equal to the difference in height between the largest window and the other windows, plus the length of the respective yoke. (For the largest window, stops 88 and 90 are located directly above and under yoke 84).

The shades can be made of a flexible, light-resistant, and light-impermeable material, such as natural or synthetic fabric.

FIGS. 1 to 11–Operation

In the initial position of shades, when the windows are unshielded, each shade is wound in a roll under effect of its springs 104 and 106, as shown in FIG. 11.

When a driver wants to shield the automobile windows, e.g., when an automobile is parked in a sunny place, the driver pulls handle 110 in the window-shading direction, e.g., in the direction of an arrow A in FIG. 1. As handle 110 moves in this direction, it pulls cord 42 to the left, and, hence, all shades 94 and 96 are moved down. As mentioned, only two shades 94 and 96 are shown. It is understood, however, that shades of all windows are identically connected to endless cord 42, so that movement of the cord is accompanied by simultaneous movement of all shades in the windowshading direction, i.e., in the downward direction.

In the course of its movement, cord 42 is guided over respective pulleys. In vertical column 22e, cord 42 is guided over pulleys 64, 66, and 68. Stop element 88 also is moved in the rightward direction. During its movement, stop 88 comes into contact with yoke 84 and pushes it downward. Yoke 84 is connected to and will thus also pull shades 94 and 96 down.

For the smallest window of the automobile, the positions of stops 88 and 90 are adjusted so that the distance between them equals the difference in the heights of the largest and the smallest window plus the length of the yoke. The same principle is used for positioning respective stops on a window of any size, i.e., the distance between the stops for any window is equal to the difference in heights between this particular window and the largest one plus the length of the yoke. On the largest window, the stops are located directly above and below a respective yoke.

While shades 94 and 96 are pulled down, the driver's hand overcomes the resistance of springs 104 and 106 which are unwound when yoke 84 is pushed down by stop 88.

On a small window stop 88 may not yet reach yoke 84, while stop 90 already moved down from yoke 84. In this position, the system consisting of yoke 84 and shades 94 and 96 will be held in place by the resilient forces of springs 104 and 106.

As handle 110 reaches its extreme left position, which corresponds to complete shading of the automobile window, projection 120 is snapped-in by lock 124. Now all windows of the automobile are shielded with the shades.

When the shades are moved back to their unshielded position, the operations are repeated in a reverse order, i.e., handle 110 is moved to the right in the direction opposite to arrow A, projection 120 is released from lock 124, stops 90 and 88 move upward, stop 90 pushes yoke 84 and shades 94 and 96 upward, and the shades unshield the window.

As handle 110 reaches its extreme right position, which corresponds to complete unshading of the automobile windows, projection 122 is snapped-in by lock 126. Now all windows of the automobile are unshielded.

Figure 13:
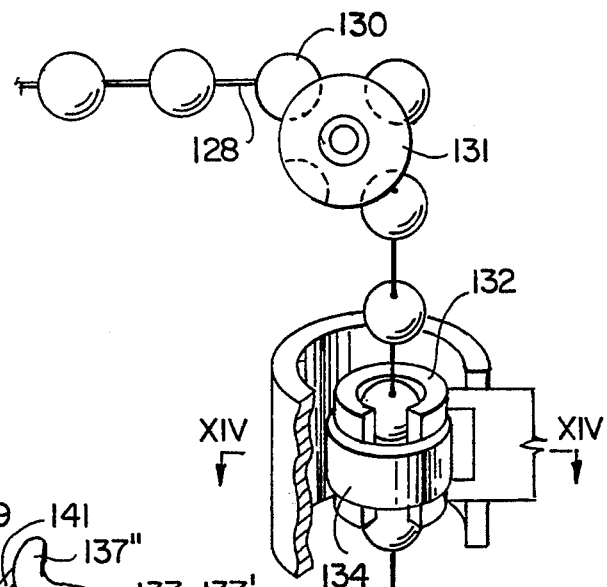
FIG. 13 is a perspective view of a portion of an endless flexible element in accordance with a second embodiment of the invention.
Figure 14:
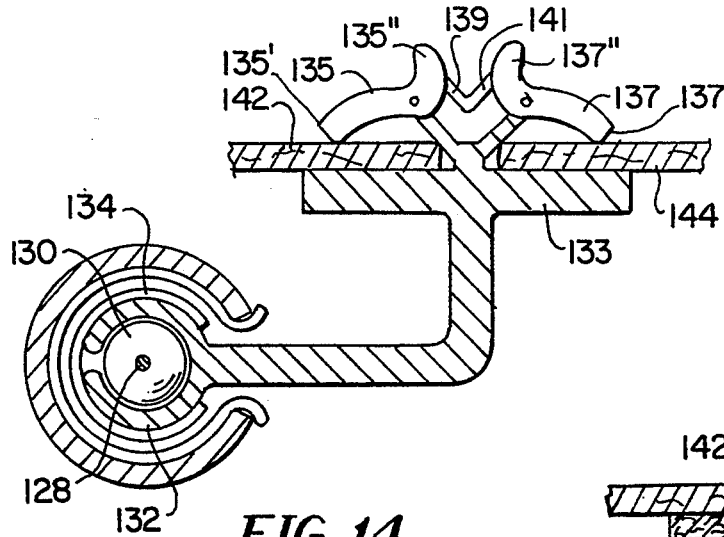
FIG. 14 is a transverse sectional view taken in the direction indicated by line XIV–XIV of FIG. 13.
Figure 15:
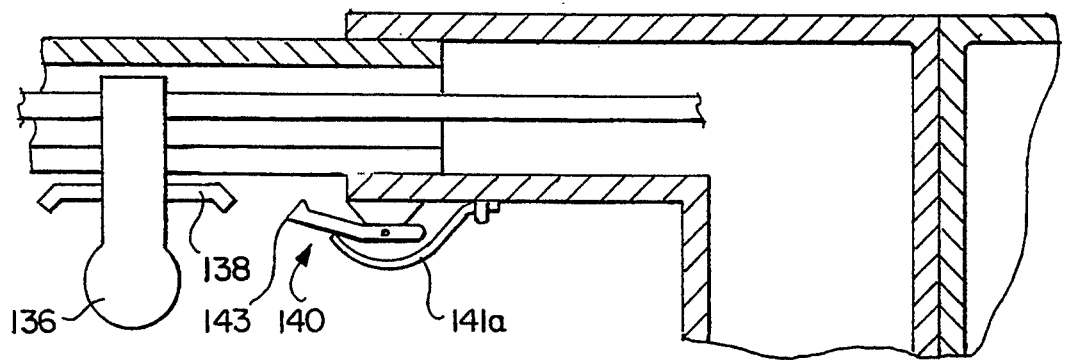
FIG. 15 is a sectional view of a positive lock for fixing the endless flexible element in place.

FIGS. 13–15–Endless Flexible Element With Beads Or Expansions

FIG. 13 through 15 show another embodiment of the system of the invention which allows selective shading and unshading of various windows.

In general the system of this type is similar to that described above and therefore only those parts and elements which are different will be described. Cord 42 is replaced by a flexible element composed of a thread 128 with beads or expansions 130. The system does not need stop elements, such as elements 88 and 90 of the previous embodiment. However, yoke 132 has a resiliently expandable portion, e.g., a C-shaped cross-sectional configuration which is shown in FIG. 14. FIG. 14 is a sectional view in the direction of lines XIV—XIV of FIG. 13. The C-shaped portion of yoke 132 is embraced by a C-shaped spring 134 which makes the yoke resilient. The expansions have dimensions which allow their passage through respective pulleys, such as pulley 13 1 shown in FIG. 13.

Expansions 130 have diameters slightly exceeding the inner diameter of yoke 132 so that the yoke develops a compressive force on each bead when the latter passes through the C-shaped portion of the yoke. The compressire force is sufficient to drag the yoke when an axial force is applied to the beaded flexible element. In order to provide independent movement for all shades, each shade has an independent attachment to yoke 132. As shown in FIG. 14, foot 133 of yoke 132 supports edges of two adjacent shades 142 and 144. Shade 142 and 144 do not overlap each other but have a gap between them or can have a butt connection. Shades 142 and 144 are connected to foot 133 by spring-loaded clips 135 and 137. Each clip comprises a two-arm lever. One arm 135' or 137' of each lever is pressed by a spring 139 or 141 to the edge of shade 142 or 144, respectively. Opposite arms 135" or 137" serve as handle for releasing the clamp.

Figure 14A:
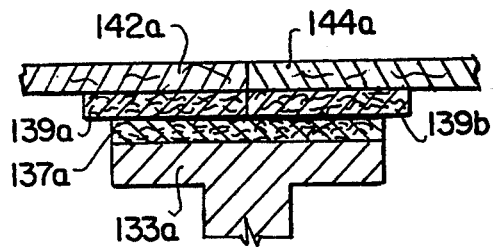
FIG. 14a is a sectional view showing a hook-and-loop connection of the shades to a yoke in accordance with another embodiment of the invention.

FIG. 14A shows another version of the shade attachment mechanism. In this embodiment, foot 133a is coated with a dense arrangement of loops 137a, while edges of respective shades 142a and 144a have a dense arrangements of hooks 139a and 139b. When hooks 139a and 139b are pressed to loops 137a, they removably but firmly interlock with each other.

Handle 136 has a projection 138 (FIG. 15) while in the extreme position of the handle, frame 20 has a spring-loaded lock 140. Lock 140 comprises a two-arm lever which is spring-loaded by a spring 149a. One arm of the spring has a locking projection 143 which engages projection 138 of handle 136. This lock fixes handle 136, and hence endless thread 128 with its expansions, in a locked position against any movement. On the other hand, yoke 132 can be moved with respect to thread 128 so that its C-shaped portion is expanded and passes over expansions 130. Since yoke 132 is connected to shades 142 and 144, it will move shades 142 and 144 as well.

It is important that the force holding thread 128 with its expansions immobile is greater than the force required for expanding C-shaped yoke 132 and passing it over the fixed thread.

Projection 138 and handle 136 can be released from lock 140 by pressing a spring-loaded lock 140.

The mechanism described above in connection with FIG. 15 makes it possible to lock beaded thread 128 with expansions and to move selective yokes along vertical columns 22a through 22f.

On their lower ends, shades 94 may have a load 143a which counterbalance the force of springs 104 and 106 (FIG. 10)

FIGS. 13–15–Operation Of Flexible Element With Expansions

When endless thread 128 with expansions is pulled down or up, the expansions, which have greater diameters than yoke 132, pull yoke 132 down or up until further movement of yoke 132 is arrested by a respective foot or T-shaped connector. When yoke 132 is stopped, e.g., on the smallest window, further application of a force to endless thread 128 from the driver's hand will pull expansions 130 through C-shaped yoke 132 by expanding the inner diameter of the now immobile yoke. This will in turn allow expansions 130 to pass through yoke 132 until other windows of larger size are completely shielded or unshielded.

When the entire system is in a shielded position and thread 128, and hence handle 136, are locked by lock 140, and it is necessary to shield some of the windows, the driver or a passenger moves yoke 132 down along a respective vertical column. As yoke 132 moves down along now immobile thread 128, spring-loaded C-shaped yoke expands and passes sequentially over expansions 130, as described above. When yoke 132 and a similar adjacent yoke (not shown) located on the left or on the right side from yoke 132 move, they pull the shades which are attached to them. As the forces of springs 104 and 106 are counterbalanced by loads 143a, shades 142a and 144a can be left in an arbitrary vertical position. Then a pair of adjacent yokes is moved down, they pull down in a plane-parallel motion a respective shade which is located between these yokes. At the same time, this yoke will pull shades located on the sides of the central shade in an inclined manner. This is because the opposite ends of side shades are fixed and connected to other now stationary yokes. Partial shading may be used instead of a sun-protective visor on the windshield and side windows of the automobile.

In case it is necessary to shield only one window, while the others remain unshielded, it is necessary to disconnect hooks 139a and respective hooks on the other side (not shown) of the shades, e.g., shade 142a from loops 137a and respective loops (not shown) on the other side of this shade. As a result, the lower end of shade 142a will be released from the yokes. Now the lower end of shade 142a can be pulled down by unwinding shade 142a. As counterweight 143a counterbalances the force of springs 104 and 106, shade 142a will remain in the installed position. If necessary, hooks 139a and hooks on the other side of shade 142a can be attached to respective loops 146 on cover 50 and to loops on the cover on the other side of the shade, so that shade 142a will be fixed in the adjusted shielded position, while other shades will remain unshielded.

Figure 16:
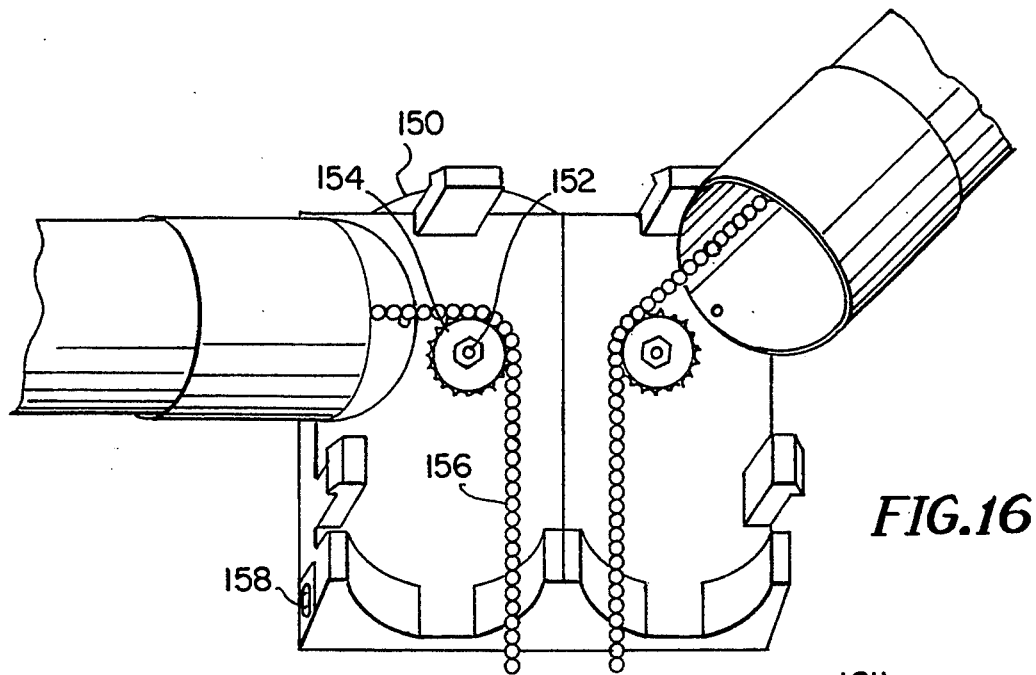
FIG. 16 is a diagrammatic view of an embodiment employing a motor-drive.
Figure 16A:
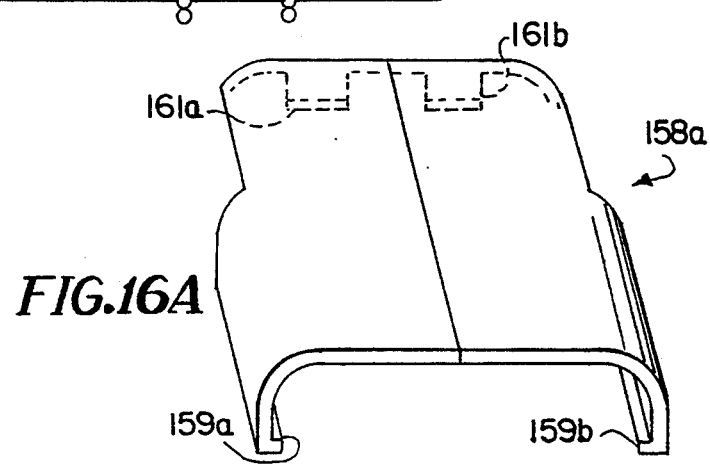
FIG. 16a is a perspective view of a cover for a connector used in the embodiment of FIG. 16.

FIG. 16–System with Drive Motor

Instead of manually pulling the shades, the system may be provided with a drive motor, such as a reversible electric motor 150 shown in FIG. 16, a fragmental sectional view of the cord-guiding system in the areas of a T-shaped connector. An output shaft 152 of motor 150 is rigidly connected to one of cord guiding elements which in the illustrated case is made in the form of a sprocket 154. A portion of cord 42a which is guided over sprocket 154 comprises a roller chain 156 which in mesh with sprocket 154. Roller chain 156 has a length equal to or slightly greater than the height of the largest window (not shown). A motor-starting pushbutton 158 may be located in any place convenient for the driver or a passenger to push this button.

The rest of the system remains the same as the one described earlier. The connector of FIG. 16 is protected by a cover 158a which has snap-in edges 159a, 159b, 161a, and 161b.

FIG. 16-Operation of Motor-Driven Window-Shading System

The motor-driven system operates in the same manner as the manually-driven system described above with the exception that instead of pulling handle 136, the driver or a passenger presses pushbutton 158 which energizes motor 150. Rotation of motor 150 drives sprocket 154 which moves endless flexible element 156 together with the shades in a required direction. Since the motor is reversible, a second press of pushbutton 158 will reverse the motor and move the shades in the opposite direction.

Figure 17:
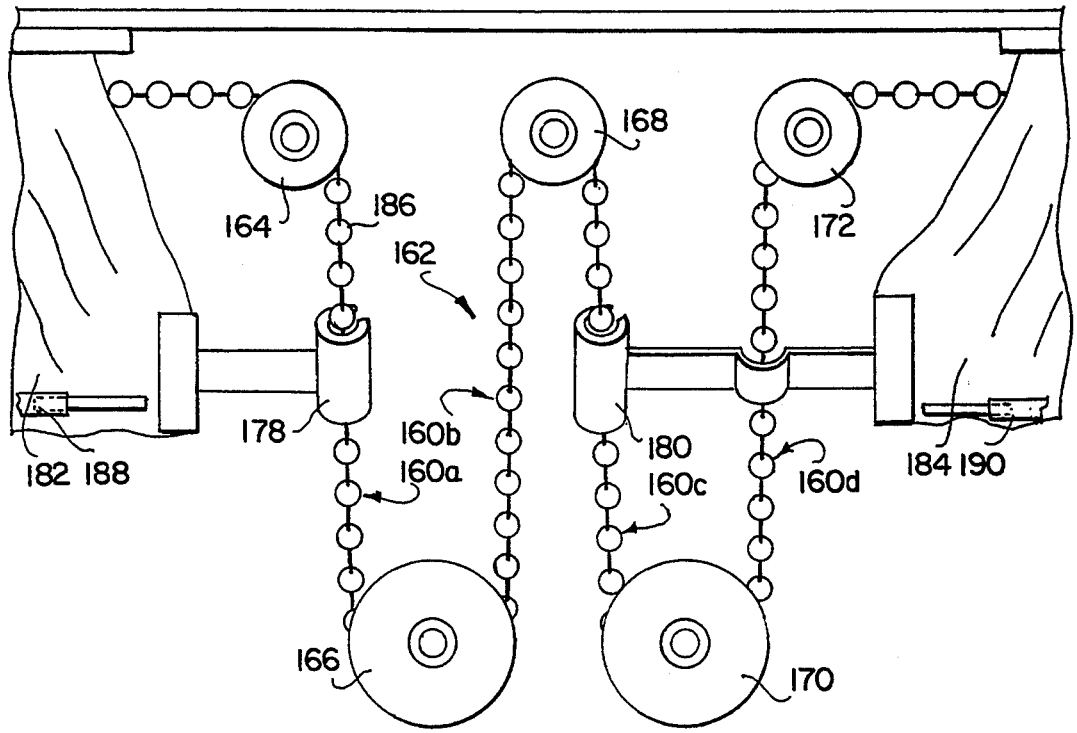
FIG. 17 is a diagrammatic an embodiment using an independent yoke on each side edge of the shade.

FIG. 17-Yokes Separated at Side Edges of Shades

In the embodiment of the system shown in FIG. 13, separate movement of selected shades was allowed due to separation of edges of adjacent shades by providing separate clips 135 and 137 for edges of adjacent shades 142 and 144. This is necessary for separate movement of the selected shade, so that shade 142 can move independently of shade 144. The same objective can be achieved by utilizing a system shown in FIG. 17.

FIG. 17 is a schematic side view of another independent-shade movement system for guiding a beaded cord through a T-shaped connector and a vertical column.

The system of FIG. 17 contains four parallel runs 160a, 160b, 160c, and 160d of a beaded thread 162 which is guide over five pulleys 164, 166, 168, 170, and 172. Yoke 178 is connected to the side edge of a shade 182 while yoke 180 is connected to the side edge of shade 184. Yokes 178 and 180 each have the same C-shaded portion (not shown) as one shown and described with reference to FIG. 14 so that each yoke 178 and 180 may slide over beads 186 of beaded thread 162 when the latter is fixed against movement by any suitable locking mechanism (not shown). This may be the same mechanism as the one shown in FIG. 15. Yoke 178 engages mn 160a and yoke 180 engages run 160c.

Each shade may have on its lower side a rigid tube, i.e., shade 182 has a tube 188 and shade 184 has a tube 190. Since the shades may have a trapezoidal form conforming the shape of an automobile's window, each tube 188 and 190 may have a telescopic structure for variation of its length. Similar to shades of the previous embodiment, shades 182 and 184 also have pockets and springs (not shown in FIG. 14).

The left side of shade 182 and the right side of shade 184 have the same attachment mechanisms as those shown in FIG. 14.

FIG. 17-Operation of the System with Separated Yokes

The system of FIG. 17 operates in the same manner as the system of FIGS. 13 and 14 with the following exception: Instead of releasing the selected shade by using clips 135 and 137, the driver or a passenger does not to release any clips or shade holding mechanism, provided that beaded thread 162 is locked against movement. For example, if it is necessary to unshield only shade 182, tube 188 should be pushed up; the springs (not shown) will assist in winding the shade up. In case it is necessary to shield the windows, tube 188 should be pulled down.

Figure 18:
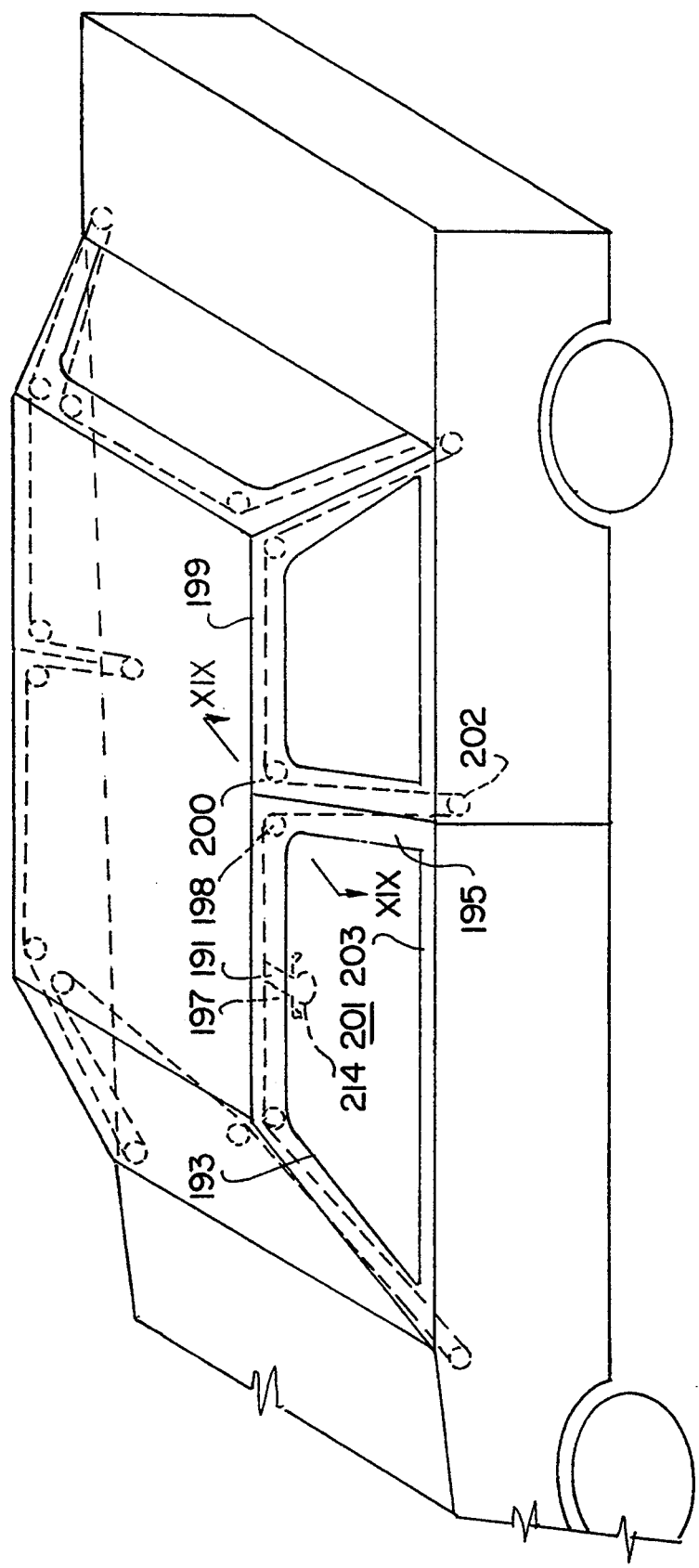
FIG. 18 is a schematic perspective view of the shading system of the invention showing how it is attached directly to the outer surfaces of facing panels of an automobile's interior.

FIG. 18-Direct Attachment to Facing Panels of Interior

The system of the invention may be embodied without the use of frame 20 shown in all previous embodiments.

A window shading system which is attached directly to outer surfaces of facing panels of the automobile's interior is shown schematically in FIG. 18. FIG. 19 is a sectional view along lines XIX—XIX of FIG. 18. This embodiment is the same as those described above, except that studs 192, 194, and 196, which support pulleys 198, 200, and 202, respectively (which correspond to pulleys 64, 66, and 68 of FIG. 2) are attached directly to a facing panel 204 of the automobile's interior. Pulleys 198 and 200 are located above the level of upper sides 197, 199, etc. of window 201, etc., while pulley 202 is located below the level of a lower side 203, etc., of windows 201, etc.

An endless cord 191 is guided over pulleys 198, 200, 202, etc., outside vertical sides 193, 195, etc., and upper sides 197 and 199, etc., of windows 201, etc.

A yoke 206 has the same L-shaped configuration as yoke 82 of FIG. 9. It also has a pad 208 which supports shades 210 and 212. The shade may be fixed to pad 208 by any method described above, e.g., by clamps or by a hook-and-loop connection (not shown).

As shown in FIG. 18, the system has a handle 214 which is attached to a cord 191. The latter is guided in an endless manner over a system of pulleys 198, 200, 202, etc. The remaining elements, i.e., the stops, locks, etc., are the same as described above.

The system operates in the same manner as the system of FIGS. 1 to 17.

Figure 19A:
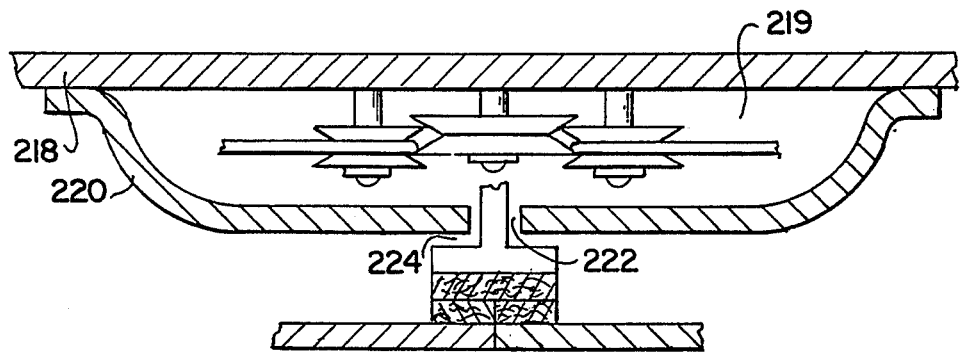
FIG. 19a is a sectional view similar to FIG. 19 for the case where the cord-guiding system is located under the facing panels of the automobile's interior.
Figure 19:
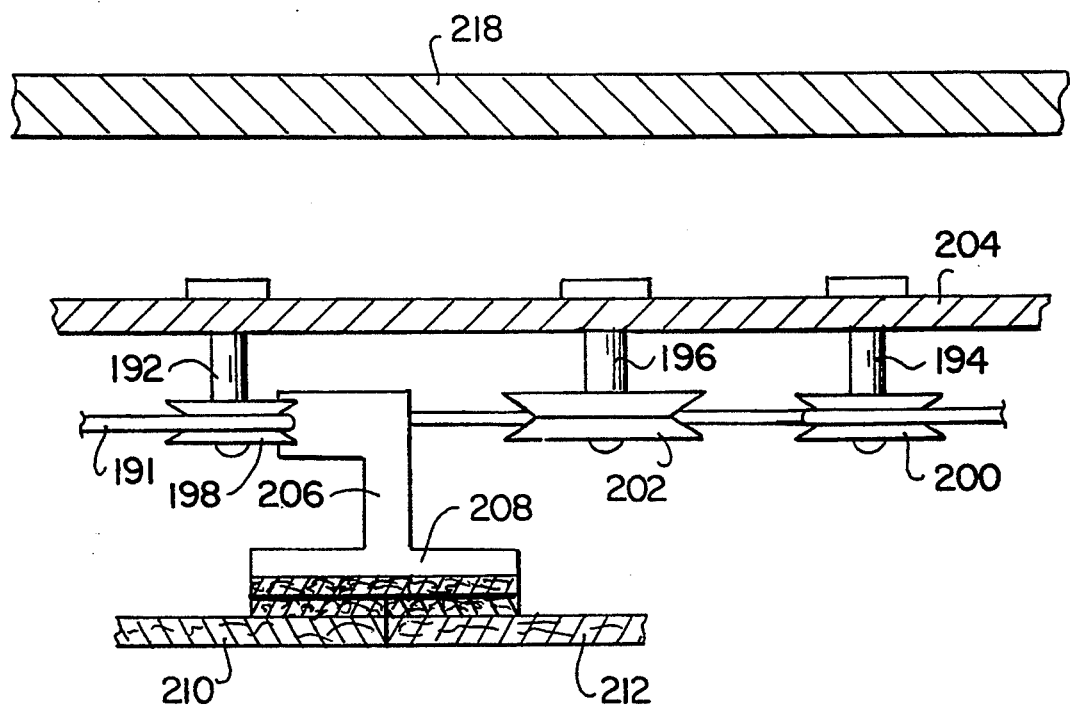
FIG. 19 is a sectional taken view along the line XVIII—XVIII of FIG. 18.

FIG. 19a-Window-Shading System Hidden Beneath Facing Panels

The window-shading system may be hidden under the facing panels of the automobile's interior. FIG. 19a is a sectional view similar to FIG. 19 for the case where the cord-guiding system is located under the facing panels of the interior.

This system differs from the one shown in FIGS. 19 in that it is located in a space 219 between an automobile body 218 and facing panels, such as a facing panel 220 of the interior. In this case, appropriate slots, such as a slot 222, must be formed in facing panel 220 for passing an L-shaped element 224 of the yoke. The remaining details of the system and its operation are the same.

Summary, Ramifications, Scope

Thus, it has been shown that I have provided an automobile window shade system which protects the entire automobile interior from direct sunlight, which makes it possible to shield and unshield all automobile windows simultaneously by one movement, which is adjustable in a vertical direction, which is durable and has long service life, and which is capable of selectively shading or unshading separate automobile windows.

Although the system has been shown and described in the form of specific embodiments, these embodiments, their parts, materials, and configurations have been given only as examples, and that other modifications of the system are possible. For example, the shading system may be used not necessarily in an automobile but in a room of a house. The number of horizontal and tubular sections and the number of shields may be different. The handle may be located both on horizontal and on vertical elements. The shades may be connected to yokes by buttons or other fasteners and may be made of fabric or may consists of a plurality parallel horizontal slats interconnected by flexible elements. A chain and sprockets can be used instead of a cord and pulleys. The system for guiding an endless flexible element may have a path different from that shown and described above and may have more than three pulleys within the T-shaped connector and inside each column. The connectors themselves may have configurations other than those shown in the drawings. Although the system is shown located inside a tubular frame which is attached to the automobile's body, it may be incorporated into the interior of the automobile's body. The shades of the windshield may have a cutout for a rearview mirror or may have any other configuration convenient for the automobile's interior. The pulling force which is applied to the flexible elements may be developed by an electric motor.

Therefore, the scope of the invention should be determined, not by the example given, but by the appended claims an their legal equivalents.

I claim:

1. A window shade system for an automobile having a body with a plurality of windows, each of said windows having a lower side, an upper side, and a periphery defining the shape of each of said windows, said system comprising:

at least one flexible element which is guided along said periphery of each of said windows and is composed, at least on a portion of its length, of a plurality of expanded portions;

a plurality of guide elements for guiding said at least one flexible element along said periphery of each of said windows;

a plurality of shading elements attached to said at least one flexible element so that said plurality of shading elements can be moved together with said at least one flexible element with respect to said windows between a window shading position and a window unshading position;

moving means on said at least one flexible element for moving said plurality of shading elements;

said moving means comprising at least one yoke connected to at least one of said plurality of shading elements;

said at least one flexible element being an endless flexible element;

said at least one yoke having a resiliently expandable means for developing a compressive force and embracing at least one of said plurality of expanded portions so that when an axial force is applied to said at least one flexible element, said at least one yoke can be dragged by said at least one flexible element.

2. The system of claim 1, further including a hollow frame for installation inside said body, said hollow frame being composed of a plurality of horizontal elements and a plurality of vertical elements, each of said vertical elements being connected to an adjacent one of said horizontal elements by a connector, said at least one flexible element moving within said hollow frame and said body forming a stationary part of said system, said at least one yoke having a projection, said each of said vertical elements having a slot, said projection projecting through said slot.

3. The system of claim 2 wherein each of said plurality of guide elements comprises a first pulley, a second pulley, and a third pulley, said first pulley and said second pulley being rotationally installed inside one of said connectors, one of said vertical elements being connected between a pair of adjacent horizontal elements, said third pulley being rotationally installed inside said one vertical element, said one vertical element being inserted into said one connector, said third pulley being located below said lower sides of said windows, said flexible element being sequentially guided over said first pulley, said third pulley, and said second pulley, so that it forms a first vertical run and a second vertical run inside said one vertical element, said expanded portions having dimensions which allow their passage through said pulleys.

4. The system of claim 3 wherein said resiliently expandable means comprises a spring element.

5. The system of claim 4 wherein said connector has a first part and a second part, said first part and said second part being turnable with respect to each other for about 90° around their vertical axes.

6. The system of claim 5 wherein said shading elements are made of a flexible, light-impermeable material, said shading elements having a plurality of resilient elements attached to said respective shading elements, said resilient elements constantly tending to move said shading elements, said first and said second parts of said connector being connected by a flexible band.

7. A window shade system for an automobile having a body with a plurality of windows, each of said windows having a lower side, an upper side, and a periphery defining the shape of each of said windows, said system comprising:

at least one flexible element which is guided along said periphery of each of said windows and is composed; at least on a portion of its length, of a plurality of expanded portions;

a plurality of guide elements for guiding said at least one flexible element along said periphery of each of said windows;

a plurality of shading elements attached to said at least one flexible element so that said plurality of shading elements can be moved together with said at least one flexible element with respect to said windows between a window shading position and a window unshading position;

moving means on said at least one flexible element for moving said plurality of shading elements;

said moving means comprising at least one yoke connected to at least one of said plurality of shading elements;

said at least one yoke having a resiliently expandable means for developing a compression force and embracing at least one of said plurality of expanded portions so that when an axial force is applied to said at least one flexible element, said at least one yoke can be dragged by said at least one flexible element.

8. The system of claim 7, further including a hollow frame for installation inside said body of said automobile, said hollow frame being composed of a plurality of horizontal elements and a plurality of vertical elements being connected to an adjacent one of said horizontal elements by a connector, said at least one flexible element moving within said hollow frame and forming a moveable part of said system; said hollow frame and said body forming a stationary part of said system, said at least one yoke having a projection, said each of said vertical elements having a slot, said projection projecting through said slot.

9. The system of claim 8 wherein said guide elements are attached to said body.

10. The system of claim 8 wherein said guide elements are attached to said hollow frame.

11. The system of claim 8 wherein each of said plurality of guide elements comprises a first pulley, a second pulley, and a third pulley, said first pulley and said second pulley being rotationally installed inside one of said connectors, said third pulley being rotationally installed inside said one vertical element, each of said vertical elements being located between a pair of adjacent horizontal elements, said one vertical element being inserted into said one connector, said third pulley being located below said lower sides of said windows, said flexible element being sequentially guided over said first pulley, said third pulley, and said second pulley, so that it forms a first vertical run and a second vertical run inside said one vertical element, said expanded portions having dimensions which allow their passage through said pulleys.

12. The system of claim 8 wherein said resiliently expandable means comprises a spring element.

13. The system of claim 12 wherein said connector has a first part and a second part, said first part and said second part being turnable with respect to each other for about 90° around their vertical axes.

14. The system of claim 13 wherein said shading elements are made of a flexible, light-impermeable material, said shading elements having a plurality of resilient elements attached to said respective shading elements, said resilient elements constantly tending to move said shading elements, said first and said second part of said connector being connected by a flexible band.

* * * * *